(12) United States Patent
Givet

(10) Patent No.: US 6,186,639 B1
(45) Date of Patent: Feb. 13, 2001

(54) OPTICAL SAFETY BARRIER WITH REPOSITIONABLE FIXTURES

(75) Inventor: Jean-Bernard Givet, Corenc (FR)

(73) Assignee: Schneider Electric SA, Boulogne Billancourt (FR)

( * ) Notice: Under 35 U.S.C. 154(b), the term of this patent shall be extended for 0 days.

(21) Appl. No.: 09/227,352

(22) Filed: Jan. 8, 1999

(30) Foreign Application Priority Data

Jan. 8, 1998 (FR) .................................................. 98 00131

(51) Int. Cl.[7] ........................................................ F21S 8/00
(52) U.S. Cl. ........................ 362/147; 362/270; 362/371; 340/541; 340/556
(58) Field of Search ..................................... 362/147, 220, 362/221, 370, 371; 340/555, 545.1, 545.3, 556, 541

(56) References Cited

U.S. PATENT DOCUMENTS

| | | | |
|---|---|---|---|
| 4,130,860 | * 12/1978 | Careglio et al. | ...................... 362/217 |
| 4,507,719 | * 3/1985 | Quiogue | ................................ 362/404 |
| 5,302,942 | 4/1994 | Blau . | |
| 5,550,725 | * 8/1996 | Shemitz et al. | ...................... 362/282 |

FOREIGN PATENT DOCUMENTS 2 022 820    12/1979   (GB) .

* cited by examiner

*Primary Examiner*—Sandra O'Shea
*Assistant Examiner*—John Anthony Ward
(74) *Attorney, Agent, or Firm*—Oblon, Spivak, McClelland, Maier & Neustadt, P.C.

(57) ABSTRACT

An optical safety barrier is connected to a fixed object such as a wall, a framework or other structure. The barrier includes several elements including a unit that has opposite ends and that is configured to form a protective beam which sets off an alarm if the beam is penetrated by an intrusion. An L-shaped upper support and an L-shaped lower support are configured to rotate the unit about a longitudinal axis. The lower support is able to slide longitudinally so as to enable the unit to be installed and removed. An upper end cover is arranged below the upper support and a lower end cover is arranged above the lower support. The covers hold the opposite ends of the unit. A display and dialogue unit is positioned adjacent to the beam of the unit.

9 Claims, 3 Drawing Sheets

OPTICAL SAFETY BARRIER WITH REPOSITIONABLE FIXTURES

BACKGROUND OF THE INVENTION

1. Field of the Invention

This invention concerns an optical safety barrier which is intended in particular for the prevention of access to industrial installations, and consists of:

- a unit containing the electronic and optical components, the transmitters and the receivers,
- this unit, mounted in a manner which can be adjusted optically by its two ends, about an axis, in two supports connected to a fixed object (wall, structure, framework, etc.),
- the two ends of the unit correspond to two supports, each of which is connected by a pivoting link (pivot/bearing) to the supports in order to allow optical adjustment of the barrier, and
- the means of locking the pivoting link in position.

2. Description of the Related Art

There are numerous areas in which it is necessary to prevent or forbid access to a zone using a nonmaterial barrier, such as infra-red rays, to forbid access to a dangerous machine. Such barriers can also be used to protect sensitive areas, to prevent access or to detect an intruder.

The nonmaterial safety barriers used to protect people working on dangerous machines are becoming more and more reliable. Nevertheless, if they fail, it is necessary to replace these barriers very quickly so that the machine should not be prevented from operating. This is all the more important since the protected machines frequently form part of a production line, and halting any one machine affects the whole of production.

In addition to the process of disconnecting the electrical supply, the replacement of a faulty barrier involves the mechanical dismantling of the barrier, the installation and electrical connection of the replacement barrier, and the optical adjustment of the newly-installed unit, Now this optical adjustment process is very costly in terms of time, and its also has to be carried out by equipped and specialist staff.

The aim of this invention is to provide a remedy for these disadvantages, providing it with the potential to create a safety barrier for which replacement is a very quick and simple operation which can be performed with no danger to unqualified staff.

SUMMARY OF THE INVENTION

To this end, the invention concerns an optical safety barrier of the type described above, characterised so that:

- at least one support includes an adjustable mechanical positioning device which is adjustable in accordance with the optical setting of the unit.
- the end of the unit is equipped with a fixed aperture to receive the positioning device borne by the support and locked at the set position.

In the event of total or partial barrier failure, it is necessary only to free the unit in relation to its support components, in general from one upper device and one lower device, to move aside one of these supports if necessary, to extract the defective unit, and to install a new unit. This installation is achieved very simply. It suffices merely to position the two pivot/bearing connections and to pivot the unit in relation to one of these supports so that the positioning device on the support automatically corresponds with the positioning aperture of the unit. On completion of the installation process, the unit is then locked in position by tightening up the locking screws of the support or supports.

The electrical connection can then be restored, and the barrier is ready for use.

According to another very advantageous characteristic, the support or supports of the unit take the form of two brackets.

On the basis of a further advantageous characteristic, the positioning device is an oblong curvilinear aperture, centered on the pivoting axis of the unit in relation to the support, and accommodating a nut and bolt link which is tightened up once optical adjustment has been effected.

The oblong curvilinear aperture for the positioning device and the oblong curvilinear aperture for the locking device constitute a very useful solution owing to its versatility, being suitable for all possible orientations of the unit in relation to the support.

In fact, depending on the machines or the support surfaces concerned, the orientation between the surface and the unit, that is the orientation which the barrier must present, is never fixed in a precise manner prior to initial assembly, nor is it uniform for all installations. Only the surface is fixed—in general the plane, or more usually the transmission-reception surface constituting the nonmaterial barrier. Now this plane can have any orientation in relation to the support, and in general this orientation is not known, and need not be known since the positioning device allows a new unit to be positioned automatically with no need to concern oneself with any optical adjustments.

In a particularly advantageous and simple manner, the locking device is composed of the following:

- an oblong curvilinear aperture, created in the support, and centered on the pivoting axis,
- threading tapped in the end corresponding to the unit, and a bolt passing through the oblong aperture to connect with the tapped threads.

According to another very advantageous characteristic, the mechanical positioning device and the locking the pivoting link between the unit and its supports are accessible only by means of tools which are different in nature.

It is very important that the person who is replacing the defective unit, and who is necessarily unqualified, should not be able to alter the setting of the positioning device accidentally. To this end, it is particularly useful that the tool used to remove the faulty unit and to install the replacement unit, cannot be used in the mechanical positioning devices.

In order to achieve such a characteristic in practice, it is useful that the positioning device has a slot-head screw and that the locking device has a hexagonally-headed screw. In these conditions, there is never any danger that the slot-head screw will be undone by the hexagonal spanner.

If the positioning device should happen to be loosened accidentally, in the case of two positioning devices, that is two supports fitted with one positioning device each, it will still be possible to re-position the new unit, and to lock the disturbed positioning device after the replacement unit has been installed.

If only a single positioning device is used however, it is essential that any disturbance of the positioning device be avoided.

According to a further beneficial characteristic of the invention, the positioning device has a slot-head screw and the locking device has a hexagonal-head screw.

This solution is particularly useful because the unit is composed in general of an extruded tube, cut along its length, and fitted at both ends with a cover. The cover, which is an injection moulded part, in a polymer material for example, can have a relatively complex shape.

Finally, according to another advantageous characteristic of the invention, the positioning and locking devices at each end of the unit are doubled-up, this constituting an additional safety factor.

BRIEF DESCRIPTION OF THE DRAWINGS

This invention will be described in a more detailed manner below, with the aid of appended drawings in which.

DETAILED DESCRIPTION OF THE INVENTION

Figure 1:
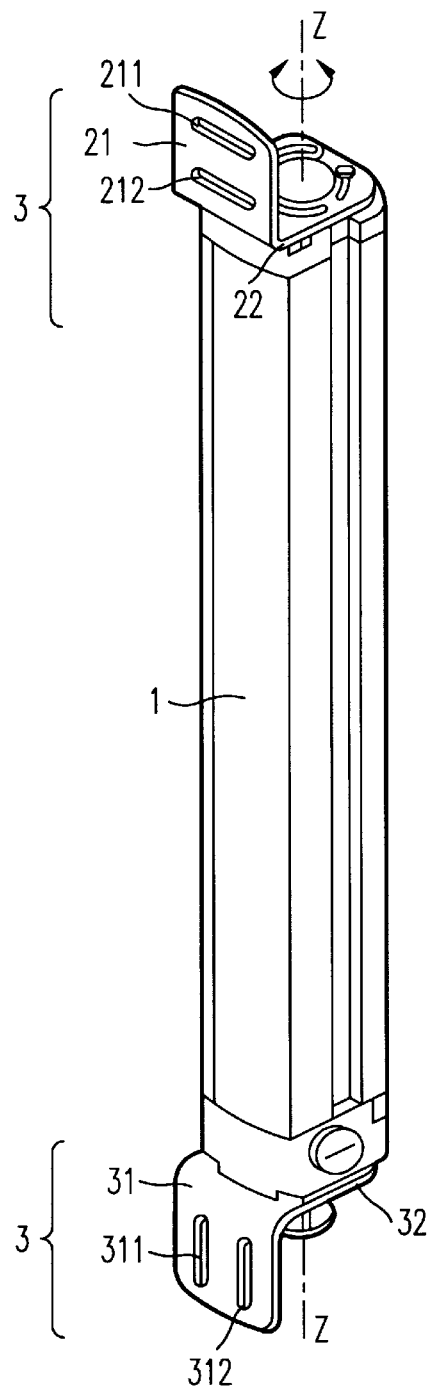
FIG. 1 is a rear view in perspective of the safety barrier.
Figure 2:
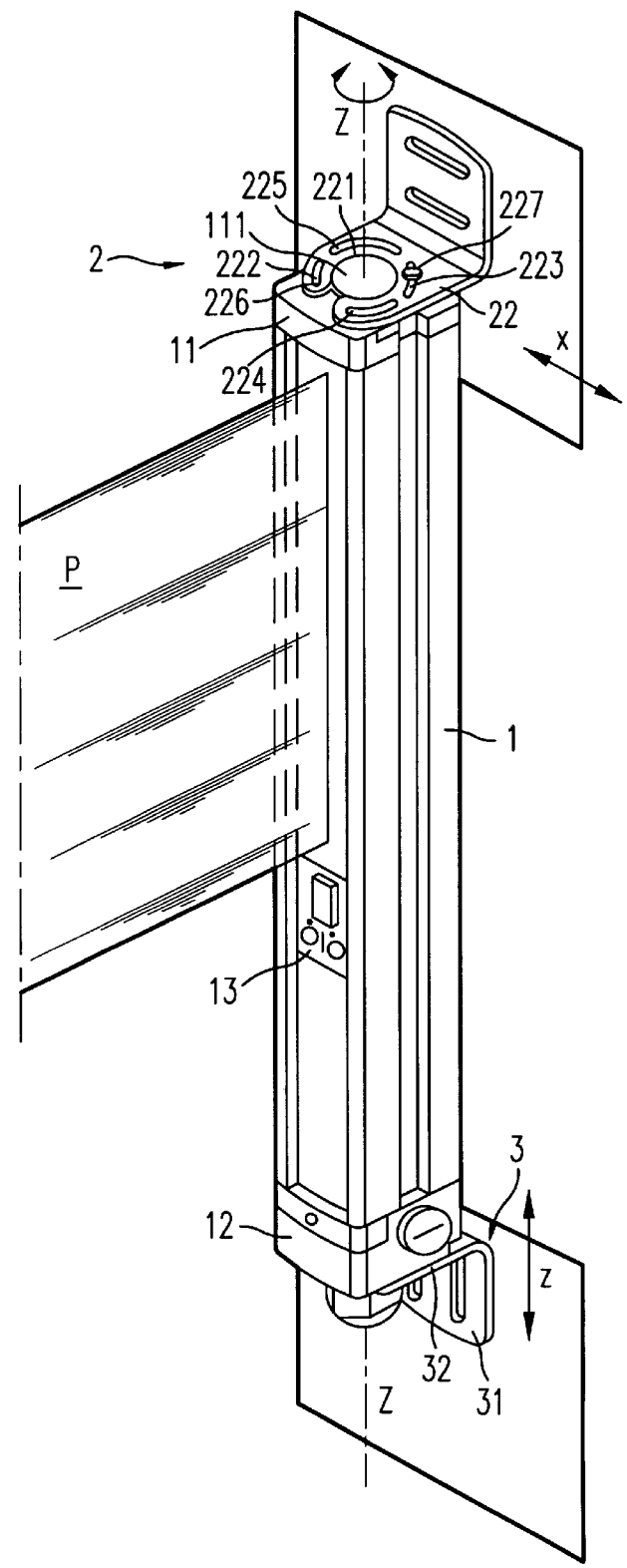
FIG. 2 is a view in perspective which shows the front of the optical safety barrier, placed in a vertical position, the combination of FIGS. 1 and 2 corresponds in fact to the placement of two barriers, one acting as a transmitter and the other as a receiver, constituting in combination the nonmaterial barrier.

In accordance with FIGS. 1 and 2, the invention concerns an optical safety barrier, otherwise known as a nonmaterial safety barrier. This barrier consists of transmitters and receivers which are not detailed, which create a safety plane that is not to be crossed, either for reasons of staff protection, for the protection of property, or for the detection or prevention of intrusion. Penetration of the nonmaterial barrier, breaks a protection beam P and sets off an alarm.

Each barrier is composed of a unit (1) which contains the electronic and optical components used to form the protection beam P. This unit (1) is mounted in an adjustable fashion, in that it can be oriented by rotation about an axis Z in an L-shaped upper support (2) and an L shaped lower support (3). These two supports are identical or similar. Supports (2) and (3) are connected to a fixed object such as a wall, a framework or other structure by fixing brackets (21) and (31), which are used for the adjustable mounting of the unit (1).

Although the orientation of the unit (1) and the beam P which it forms are shown here as perpendicular to the surfaces defined by the fixing brackets (21) and (31) of the two supports (2) and (3), this orientation is not the only one possible.

The orientation of the beam, P can be in any direction in relation to the surface to which supports (2) and (3) are attached.

However once this orientation has been fixed, it will then not be altered during the use of the barrier, and when the unit (1) is replaced, this same orientation remains. The orientation can be set initially by trial and error, and finally adjusted by an optical device, each time the unit (1) is replaced. According to the invention, this fixed orientation is restored automatically when the new unit (1) is installed.

In a more detailed manner, each of the supports (2) and (3) has one bracket (21) and (31) used to attach it to the fixed structure. This bracket (21) is fitted with two longitudinal slots (211) and (212) horizontally, and bracket (31) has two vertical slots (311) and (312), as shown in FIG. 1.

The orientation of slots (211), (212), (311) and (312) enables the orientation of a plane of the beam P to be set as required.

When this orientation has been established, the brackets (21) and (31) are then attached solidly to the fixed structure.

The locking of supports (2) and (3) to the fixed structure is generally effected only after the unit (1) has been installed. This applies in particular to support (3).

Support 2 has one fixing plate (22) which is fitted with a bearing (221) in the form of a circular aperture which accommodates a stud (111) attached to an end cover (11) of the unit (1). Plate (22) also has two oblong curvilinear apertures (222) and (223) which are centered on the axis Z, diametrically opposite to each other, and two further oblong curvilinear apertures (224) and (225) also centered on the axis Z.

Figure 3:
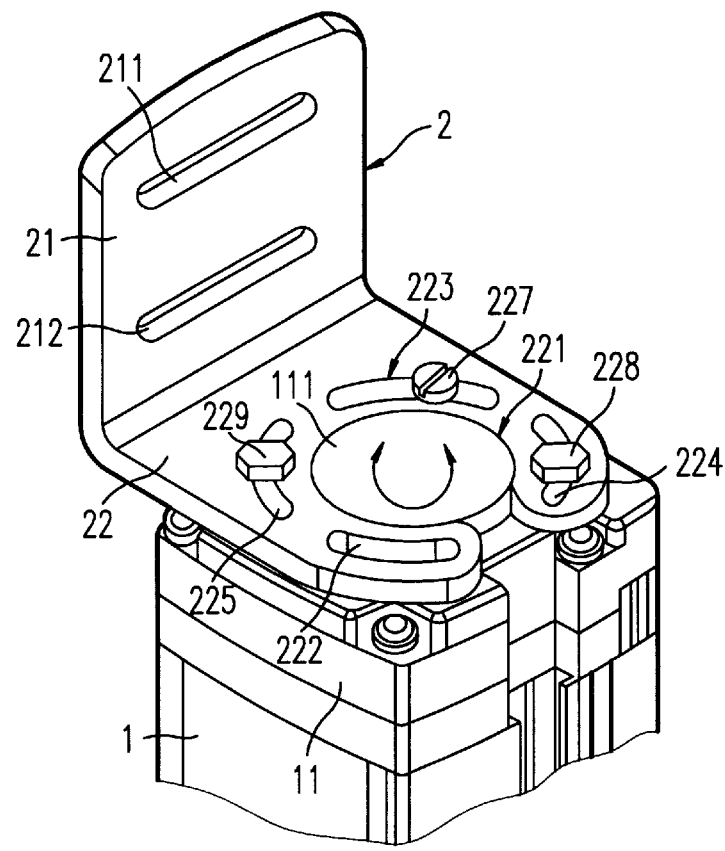
FIG. 3 is a perspective view of the end of an optical barrier unit and its support.

Oblong apertures (224) and (225) accommodate positioning devices (226) and (227), and the apertures (224) and (225) accommodate the locking devices (228) and (229) - please refer to FIG. 3.

As already indicated, for its adjustment, the unit (1) can be pivoted on its axis Z. When a detection plane for the beam P is in the appropriate orientation, the positioning devices (226) and (227) are locked in their apertures (222) and (223) in order to establish the set position of the unit (1). Positioning devices (226) and (227) are thus locked in relation to support (2), In this way, the unit (1) can be fixed in its angular position about the axis Z, in relation to support (2), using locking devices (228) and (229) of FIG. 3.

These same options also apply to the lower support (3). The lower end of the unit (1), composed of an end cover (12), also has a stud, which is not shown, which rotates about the axis Z, and is held in a fixing plate (32) of support (3). This plate (32) can also include an adjustable positioning device, not shown in the figures, and one or more locking devices to lock the position.

The only difference between the upper end cover (11) and the lower end cover (12) of the optical barrier is that support (3) is able to slide vertically in the direction of a double arrow (z) to enable the unit (1) to be installed or removed. It is necessary only to slightly undo the screws located in the slots (311) and (312) of the fixing bracket (31) to drop the support (3), clear the stud in the lower end cover (12) of the unit (1), and thus to extract the stud (111) from the, bearing (221) in the plate (22) to extract the unit (1) and to replace it. When doing the latter, after inserting the top stud (111) of the new unit (1) into the bearing (221), the lower stud is then placed in its bottom support (3), and the lower bracket (31) is raised in the direction of the double-arrow (z) until the assembly is firmly held in the two supports (2) and (3), while still remaining free to rotate about the axis Z.

The operation to install the unit (1) is then complete, with no necessity to adjust the orientation of the unit (1).

FIG. 2 shows also a display and dialogue unit (13) positioned adjacent to the beam (P) of the unit (1). The fixing plates (22) and (32) are shown perpendicular to the unit (1).

FIG. 3 illustrates the various devices described above in the case of the upper support (2) in greater detail, and in particular the fixing bracket (21), and slots (211) (212), plate (22) of the support (2) and the bearing (221) to accommodate the stud (111) attached to the upper end cover (11) of the unit (1).

This FIG. 3 clearly shows the two oblong curvilinear holes (222) and (223) which accommodate the positioning devices, only one of which device (227) is shown here.

The two curvilinear apertures (224) and (225) are also shown with their respective locking devices (228) and (229).

Figure 4:
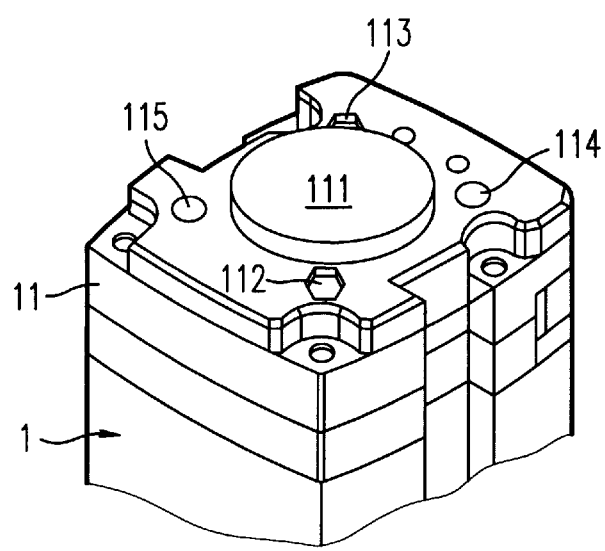
FIG. 4 shows the end of the unit without its support, again in perspective.

In accordance with this production example, the positioning devices (227) through (229) are composed of bolts with nuts. The nut is located, as seen in FIG. 4, in apertures (112) and (113) in the upper end cover (11). These apertures (112) and (113) are hexagonal in shape, to match the size and the shape of the nuts of the positioning devices.

In fact at the time of installation, the positioning devices (227) of FIG. 3 are screws that are simply placed in the apertures (112) and (113) of FIG. 4 and the screws are passed freely through the apertures (222) and (223) of FIG. 3 until they encounter the nuts.

When the optical barrier is installed for the first time, it is necessary only to undo screws positioning devices (226) and (227) of FIG. 1, and to rotate the unit (1) until it is in its correct orientation in relation to the axis Z. When this position has been found, the positioning devices (226) and (227) are tightened with the nuts located in their apertures (112) and (113) in the upper end cover (11) of FIG. 4. The positioning devices (227) of FIG. 3 are tightened by the head which can be of the slot-head type, for example. A screwdriver is therefore required to tighten the nut and bolt against the plate (22) of the upper support (2).

This operation is performed for each of the two positioning devices (226) and (227) of FIG. 2.

When the positioning devices (226) and (227) have been secured solidly to the support (2), the whole assembly can then be fixed in opposition by tightening the locking devices (228) and (229) as shown in FIG. 3, in threads (114) and (115) tapped into the upper end cover (11) in FIG. 4. The unit (1) is then fixed firmly to the support bracket (2) of FIG. 3.

These same operations are repeated for the lower end of the unit (1), though the unit (1) cannot be tightened up in this case until the two operations to adjust the positioning devices (226) and (227) of FIG. 2 in their respective apertures (222) and (223) of FIG. 3 have been completed on both the upper end cover and the lower end cover (12) of the unit (1) seen in FIG. (2). Only when both of these positioning units have been locked in position can the position of the main unit be completed, by tightening up the locking devices (228) and (229) of FIG. 3.

Removal of the unit (1) for replacement purposes is very simple. It is necessary only to undo and remove the locking devices (228) and (229), without touching the positioning devices (226) and (227). To this end, it is particularly convenient that the heads of the positioning devices (226) and (227) and the heads of the locking devices are different, and especially that these require different tools to tighten them—a hexagonal or box spanner in the case of the locking devices (228) and (229), and a screwdriver for the positioning devices (226) and (227).

Since the positioning devices are fixed to the bracket (21) and do not move, and since the apertures (112) and (113) in the upper end cover (11) of the unit (1) seen in FIG. 4 are in a unique position irrespective of the unit (1), it is very easy to re-position the unit (1) by installing it in relation to the positioning devices (228) and (229) of FIG. 3, and then tightening the assembly using the locking devices (228) and (229).

Figure 5:
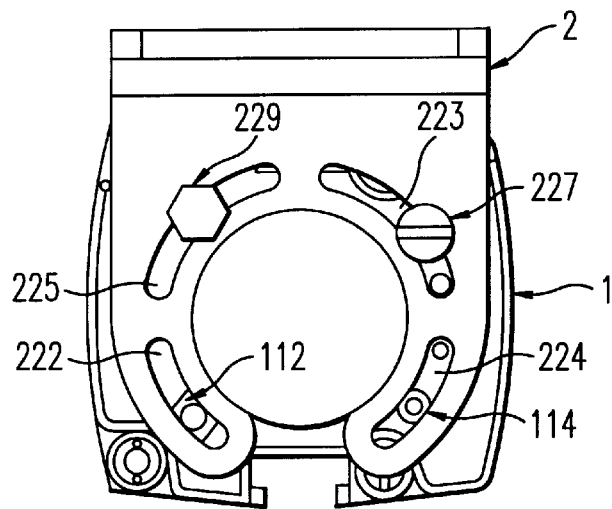
FIG. 5 is a view of FIG. 3 from above.
Figure 6:
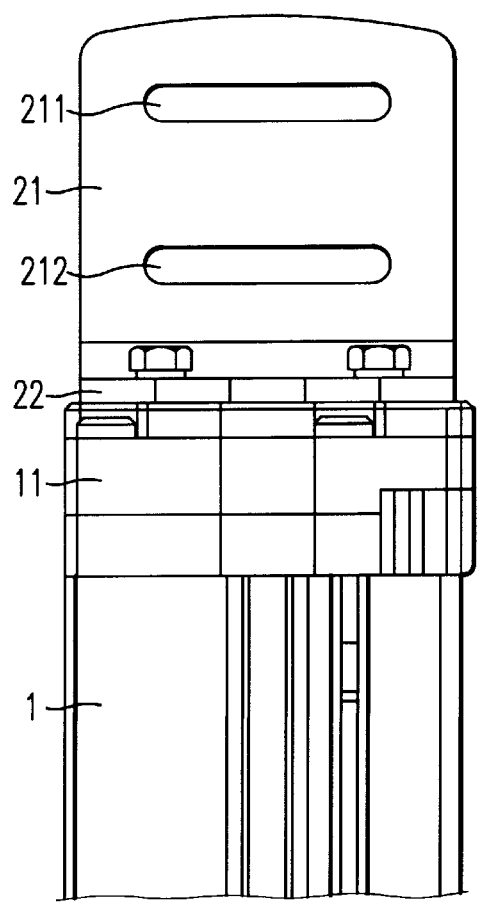
FIG. 6 is an elevational view of FIG. 3 from the side.

FIGS. 5 and 6 show the various devices described above, with views from above and from the side.

It should be pointed out that the bottom support bracket and the lower end of the unit should preferably employ the same orientation, positioning and mounting principles as those at the top end.

The redundancy of the positioning devices at the upper and lower ends of the unit is not superfluous, because it provides additional security and safety if the positioning device at one end or the two positioning devices at either end were undone or loosened accidentally. In such a case, the orientation of the unit can be established by the positioning devices at the other end of the support.

The above description has the unit (1) in the vertical position. This is merely an example, since the unit (1) can assume any longitudinal orientation to suit the location of the beam P and the options available for installing the units (1). For example, the fixed object to which the unit (1) is attached is shown schematically in FIG. 2.

What is claimed is:

1. An optical safety barrier for connection to a fixed object such as a wall, a framework or other structure, said barrier comprising:
    a unit (1) having opposite ends and being configured to form a protective beam (P) that sets off an alarm if the beam (P) is penetrated by an intrusion;
    an L-shaped upper support (2) and an L-shaped lower support (3) configured to rotate the unit (1) about a longitudinal axis (Z), said lower support (3) being able to slide longitudinally so as to enable the unit (1) to be installed and removed;
    an upper end cover (11) arranged below the upper support (2) and a lower end cover (12) arranged above the lower support (3), said covers (11) and (12) holding the opposite ends of the unit (1); and
    a display and dialogue unit (13) positioned adjacent to the beam (P) of the unit (1).

2. An optical safety barrier, according to claim 1, further comprising:
    an upper fixing bracket (21) forming a part of the L-shaped upper support (2) parallel to the longitudinal axis (Z) and being attached to the fixed object; and
    a lower fixing bracket (31) forming a part of the L-shaped lower support (3) parallel to the longitudinal axis (Z) and also being attached to the fixed object.

3. An optical safety barrier, according to claim 2, wherein:
    said upper fixing bracket (21) has a pair of longitudinal slots (211, 212) formed therein and oriented in one direction with respect to the longitudinal axis (Z); and
    said lower fixing bracket (31) has a pair of longitudinal slots (311, 312) formed therein and oriented in a direction opposite to said one direction with respect to the longitudinal axis (Z).

4. An optical safety barrier, according to claim 1, further comprising:
    an upper fixing plate (22) forming a part of the L-shaped upper support (2) perpendicular to the unit (1) and being attached to the upper end cover (11); and
    a lower fixing plate (32) forming a part of the L-shaped lower support (3) perpendicular to the unit (1) and being attached to the lower end cover (12).

5. An optical safety barrier, according to claim 4, wherein:
    said upper fixing plate (22) has a central bearing (221).

6. An optical safety barrier, according to claim 5, wherein:
    said upper end cover (11) has a central stud (111), received in the central bearing (221), for allowing the unit (1) to pivot therearound.

7. An optical safety barrier, according to claim 5, wherein:
    said upper fixing plate (22) has a plurality of oblong curved apertures (222, 223, 224, 225) formed therein around the central bearing (221).

8. An optical safety barrier, according to claim 7, further comprising:
    a pair of positioning devices (227) arranged in one pair of the oblong curved apertures (222, 223) facing each other across the central bearing (221) of the upper fixing plate (22).

9. An optical safety barrier, according to claim 7, further comprising:
    a pair of locking devices (228, 229) arranged in another pair of the oblong curved apertures (224, 225) facing each other across the central bearing (221) of the upper fixing plate (22).

* * * * *